United States Patent [19]
Van Der Weij et al.

[11] Patent Number: 5,781,245
[45] Date of Patent: Jul. 14, 1998

[54] MERGING OF VIDEO MOSAIC WITH TELETEXT

[75] Inventors: Hendrikus H. M. Van Der Weij; Robert Kettler, both of Eindhoven, Netherlands; Timothy J. Everett, Redhill, Great Britain

[73] Assignee: U.S. Philips Corporation, New York, N.Y.

[21] Appl. No.: 597,439

[22] Filed: Jan. 31, 1996

[30] Foreign Application Priority Data

Feb. 2, 1995 [EP] European Pat. Off. ............. 95200259

[51] Int. Cl.$^6$ .............................. H04N 5/445; H04N 7/10
[52] U.S. Cl. .................. 348/563; 348/7; 348/12; 348/13
[58] Field of Search .................. 348/463, 465, 348/468, 473, 563, 564, 589; 358/108, 142, 147, 188, 86; 307/354, 261; 340/731, 347, 730; 380/43; 371/37.1; 364/449; 328/133; H04N 5/445

[56] References Cited

U.S. PATENT DOCUMENTS

| | | | |
|---|---|---|---|
| 4,476,464 | 10/1984 | Hobbs | 340/731 |
| 4,584,567 | 4/1986 | Kinghorn | 340/347 |
| 4,679,083 | 7/1987 | Schmitz et al. | 358/147 |
| 4,682,161 | 7/1987 | Bugg | 340/731 |
| 4,698,677 | 10/1987 | Kinghorn et al. | 358/147 |
| 4,719,510 | 1/1988 | Kinghorn | 358/147 |
| 4,841,365 | 6/1989 | Guenot et al. | 358/147 |
| 4,894,714 | 1/1990 | Christis | 358/86 |
| 4,897,876 | 1/1990 | Davies | 380/43 |
| 4,908,706 | 3/1990 | Bugg | 358/147 |
| 4,908,707 | 3/1990 | Kinghorn | 358/147 |
| 4,910,595 | 3/1990 | Bugg et al. | 358/147 |
| 4,912,555 | 3/1990 | Van Gestel | 358/147 |
| 4,933,764 | 6/1990 | Kinghorn | 358/142 |
| 4,953,022 | 8/1990 | Bugg | 358/147 |
| 4,963,968 | 10/1990 | Bugg et al. | 358/147 |
| 4,991,017 | 2/1991 | Raaijmakers | 358/147 |
| 4,991,018 | 2/1991 | Davies | 358/147 |
| 4,992,871 | 2/1991 | Bensch et al. | 358/142 |
| 4,999,706 | 3/1991 | Kinghorn | 358/147 |
| 5,012,338 | 4/1991 | Davies | 358/147 |
| 5,014,125 | 5/1991 | Pocock et al. | 358/86 |
| 5,016,000 | 5/1991 | Bugg | 340/731 |
| 5,038,212 | 8/1991 | Van Den Hombergh et al. | 358/142 |
| 5,045,941 | 9/1991 | Davies | 358/147 |
| 5,051,616 | 9/1991 | Stuchbury | 307/354 |
| 5,070,254 | 12/1991 | Summers | 307/261 |
| 5,105,160 | 4/1992 | Summers | 328/133 |
| 5,111,462 | 5/1992 | Tarrant | 371/37.1 |
| 5,119,200 | 6/1992 | Van Den Hombergh et al. | 358/188 |
| 5,161,886 | 11/1992 | De Jong et al. | 364/449 |
| 5,184,220 | 2/1993 | Kinghorn et al. | 358/147 |
| 5,200,739 | 4/1993 | Eland | 340/730 |
| 5,208,671 | 5/1993 | Tarrant | 358/147 |
| 5,221,968 | 6/1993 | Bugg | 358/147 |
| 5,260,778 | 11/1993 | Kauffman et al. | 348/563 |
| 5,278,845 | 1/1994 | Reintjes et al. | 371/37.1 |
| 5,337,155 | 8/1994 | Cornelis | 348/473 |
| 5,353,064 | 10/1994 | Schlink | 348/468 |
| 5,386,238 | 1/1995 | Kinghorn et al. | 348/468 |
| 5,410,359 | 4/1995 | Odijk et al. | 348/468 |
| 5,461,667 | 10/1995 | Remillard | 348/468 |
| 5,485,221 | 1/1996 | Banker et al. | 348/564 |
| 5,486,865 | 1/1996 | James | 348/465 |
| 5,510,828 | 4/1996 | Lutterbach et al. | 348/13 |

OTHER PUBLICATIONS

"Teletext and Viewdata" Steve A. Money, Newnes Tecnical Boosk, 1981, ISBN 0-408-00579-1.

*Primary Examiner*—Mark R. Powell
*Assistant Examiner*—Ronald D. House

[57] ABSTRACT

Video data and TXT data are combined into a single image. The video data is representative of a mosaic of video windows. The TXT data form a plurality of TXT pages. Each TXT page is transparent in an area of one or more corresponding video windows. In an interactive application, a customized TXT page guides a user through a virtual world in video and TXT combined.

4 Claims, 2 Drawing Sheets

MERGING OF VIDEO MOSAIC WITH TELETEXT

The invention relates to a method of enabling combining video data and teletext data supplied via a transmission channel. The method includes providing the teletext data representative of a plurality of teletext pages. The invention further relates to a system operative to enable combining on a display video data and teletext data.

BACKGROUND OF THE INVENTION

Teletext (TXT) or viewdata are examples of broadcasting services that provide text data or graphics data to TV users. The service may use a TV channel for broadcasting these data as part of a normal TV signal but independent thereof, or an ordinary telephone network. A TV receiver is to be provided with an additional decoder to decode and display the text or graphics data of TXT. The decoder is enabled through selecting the TXT mode of the TV set. Within TXT, the text data are transmitted using a normal TV channel. More specifically, the TXT data are transmitted using blank lines that are inherent in the TV broadcasting and that serve to allow the scanning beams at the camera and receiver to adjust their vertical position at the end of each field-scan. Typically, up to 800 different pages of text or graphics data can be provided on a single channel, and the transmission rate is about 32 pages a second.

The expression "teletext" is used herein below as a generic term to indicate both TXT and viewdata. The expression "video data" is used herein as a generic term to indicate data suitable for being handled by a TV receiver regardless of TXT provisions, i.e., "video data" is the usual TV signal. "video data" therefore may also include audio data within the context of this invention.

TXT data typically is formatted as a plurality of pages that the user can selectively educe on his screen one at a time. It is also known to use TXT data for supplementing video data, for example, by way of subtitling the TV picture presented or by way of newsflashes inserted into the TV picture. To this end, the TXT data comprises control data that determine which among the pixels is to be written by TXT data and which by video data. For detailed background information, reference is made to: "Teletext and Viewdata" Steve A. Money, Newnes Technical Books, 1981, ISBN 0-408-00579-1, incorporated herein by way of reference.

SUMMARY OF THE INVENTION

The invention has, inter alia, for an object to expand the use of TXT and to provide new ways of combining video and TXT data.

The invention provides a method as specified in the preamble, comprising the following steps. The video data are provided representative of a synthesized image composed of a plurality of video windows. A respective one of the teletext pages is enabled to be selectively combined with the synthesized image so as to render visible at least a respective one of the video windows.

The invention uses the insight that video data and TXT data supplied via the same channel can be combined selectively when representing the video data as a mosaic of windows and rendering the TXT pages transparent in one or more of the areas on the screen associated with the relevant window. Thus, different ones among the TXT pages on the screen may be displayed together with one or more different ones of the windows. Providing a plurality of windows in video data gives the opportunity to selectively combine one or more specific video information streams with one or more TXT pages. The video data may comprise still picture windows, moving picture windows or a combination thereof. The TXT data may comprise graphics, text or a combination thereof.

Applications are manifold. Tele-shopping could well benefit from this method. For example, a supplier of video-movies using the local cable network could advertise his special offers in TXT annotated by video excerpts in different windows. Real-estate agents, motorcycle dealers or travel agencies could illustrate their TXT advertisements on the local cable by still, or even moving, pictures distributed among the windows. Also, local news stations could merge a variety of news reels in video with written reports in TXT. Weather forecast in TXT could be illustrated by video representing, e.g., images as obtained through weather radar for the various counties.

Above examples enable the user to retrieve the information when browsing through the TXT pages, typically in the conventional way. The invention may have an even greater potential in an interactive version. To this end, an application is run on a server for generating the video data and/or TXT data under user-control. At least one user is enabled to determine a content of at least the video data or the teletext data by interaction with the application via a further transmission channel to the server. The interaction preferably is in real-time. The further transmission channel may comprise a connection between the user and the server, e.g., a telephone line.

For example, an interactive TXT application could selectively provide a user with relevant video information. The real-estate agent or motorcycle dealer then could be addressed by a user interacting with a TXT application, e.g., by guiding a cursor via the further transmission channel to a graphic representation of a broker's business or a showroom (or a pub, depending on the make), respectively, in TXT graphics. The cursor may be a graphics figure such as a match-stick man that is made to wander across the screen under user-control, e.g., depending on pressing the telephone's buttons. Upon entering the broker's business or the showroom (pub), a video application or a combined TXT/video application is started in the relevant video window. The video application itself may contain graphics that typically have a higher resolution than TXT is able to provide. The match-stick man in TXT graphics may live on as a match-stick man in video graphics, again under user-control. A hierarchy of video/TXT levels can thus be envisaged. The invention can be regarded as a form of video-on-demand accessible through TXT.

A system according to the invention enables combining, on a display, video data and teletext data. The system includes first means for providing the teletext data representative of a plurality of teletext pages. The system comprises second means for providing the video data representative of a synthesized image composed of a plurality of video windows. In addition, the first means selectively provides a particular one of the teletext pages, each particular teletext page having a transparent area whose location corresponds to at least a specific one of the video windows on the display. Preferably, the first means is operative to selectively provide the particular teletext page upon a user-interaction.

An embodiment of such a system is, for example, a server that transmits the video data and the TXT data to one or more users and that receives commands from one or more users in order to provide individual ones of the TXT pages to the individual user. The data are combined on the user's display as to give the impression of a TXT page illustrated with video data.

The invention is highly suitable for multiple-user applications. A plurality of users is enabled to interact with the application. Preferably, at least one of the video windows provides information regarding the status of the plurality of users with respect to the application. This is especially interesting for applications that create a virtual world, as the status indication may help in contacting one another through the virtual world.

BRIEF OF THE DRAWING

The invention is explained below in further detail and by way of example with reference to the accompanying drawing, wherein FIG. 1 is a diagram of a mosaic video image.

Like reference symbols indicate corresponding or similar features throughout the drawing.

DESCRIPTION OF THE PREFERRED EMBODIMENTS

Figure 1:
Figure 2:
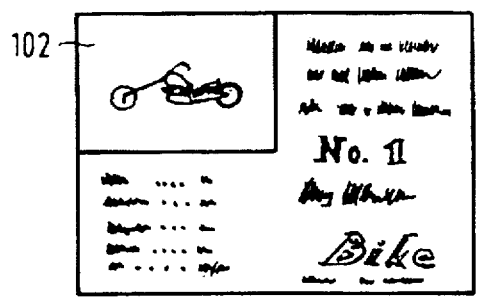
FIGS. 2–5 are diagrams of TXT pages merged with the video image of FIG. 1.
Figure 3:
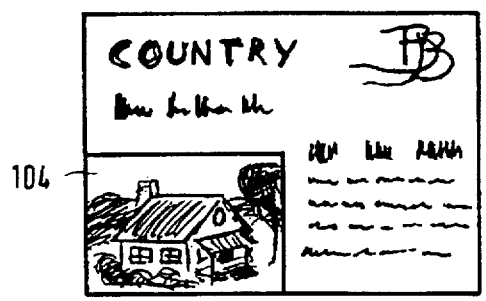
Figure 4:
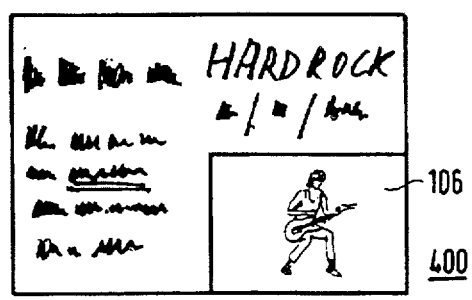
Figure 5:
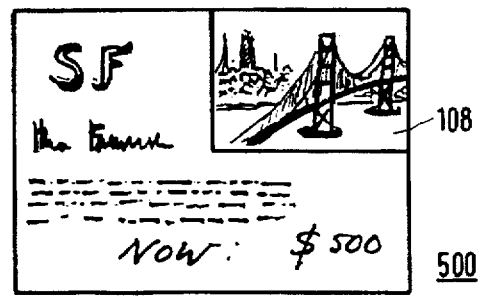

FIG. 1 shows a video image 100 that is broadcasted on a local network. Image 100 appears, e.g., as one out of a sequence of images broadcasted as the usual TV signal. Image 100 may include of a plurality of windows 102, 104, 106 and 108. For the sake of clarity, image 100 is divided into four equally sized windows in this example, but it is clear that other partitions (size, orientation and number of the windows) are feasible. Creating such a mosaic is known in the art and is typically done at the broadcasting side.

Each respective one of windows 102–108 includes a respective video image accessible through a respective TXT page. In the example shown, window 102 shows a still picture of a particular motorcycle for an advertisement. Window 104 shows a detached house in stock with a particular real-estate agent. Window 106 shows excerpts of one or more particular concerts that will be performed in a local arena. Window 108 shows a moving picture for commercials of a travel agency.

FIGS. 2, 3, 4 and 5 show examples of TXT pages 200, 300, 400 and 500, respectively, merged with image 100. A respective one of TXT pages 200–500 is made transparent in the area where the respective one of windows 102–108 is displayed on the screen. It is clear that the visible portion of the TXT pages may have any other shape than the ones shown. E.g., a TXT page may be rendered transparent in one or more areas, each surrounded by visible TXT. Several TXT pages may be transparent in the same area to show the same window.

It is noted that video and TXT data can be merged advantageously in still another manner. Assume that a TV channel broadcasts a program in the usual way as video data. If the associated video image is scaled down and arranged in a particular area of the screen (similar to PIP: picture-in-picture), the remainder of the screen can be used for TXT information much in the same way as discussed above. If the program is, e.g., a rock concert, TXT can be used to give background information while still having the video program available. Neither audio nor video information is totally lost in the TXT mode. The TV screen then may look not unlike FIG. 4, for example.

Figure 6:
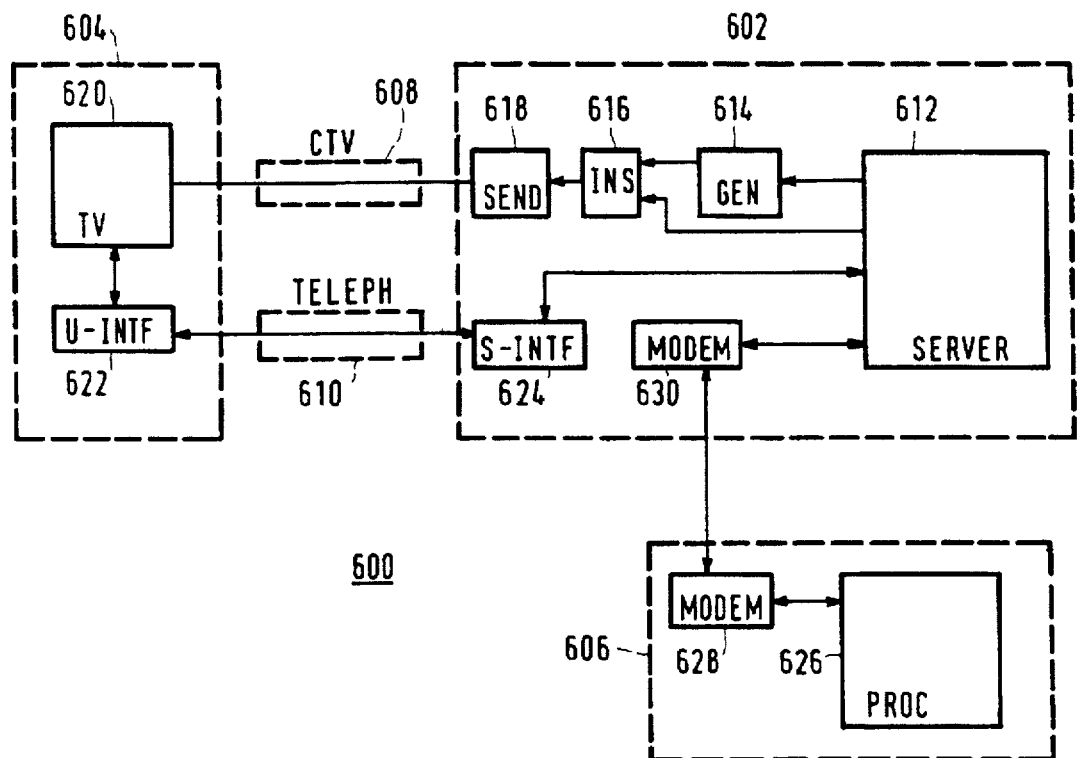
FIG. 6 is a diagram of a user-interactive system for simultaneous display of TXT and video data.

FIG. 6 is a diagram of a user-interactive system 600 that enables simultaneous and user-controllable display of TXT and video data. System 600 includes a server station 602, one or more consumer modules of which clarity, and a control centre 606. In this example, station 602 and consumer module 604 are coupled via a cable TV network 608 and a telephone network 610. Alternatives to the connection made via cable TV network 608 may be connections via a satellite or via telephone. Operation is as follows.

Station 602 includes a server 612, a TXT generator 614, an inserter 616, and a transmitter 618. Server 612 is operative to generate video data and data for TXT application. The data for TXT application is supplied to TXT generator 614 to cast the data into proper format. The video data from server 612 and the TXT data from generator 614 are supplied to inserter 616. Inserter 616 merges the TXT data and the video data into a TV signal broadcasted by transmitter 618 via network 608.

Module 604 includes a TV receiver 620 provided with TXT circuitry, e.g., as known in the art. TV receiver 620 is conventionally controlled by the user to enter the TXT mode. As discussed with reference to FIGS. 1–5, the user now is enabled to view video upon entering the TXT mode of TV receiver 620. Preferably, system 600 is provided with user-interactive features to let the user control the content of the video data and/or TXT data via a user-interactive application. To this end, module 604 is provided with a user-interface 622 that is functionally coupled to server 612. In this example, user-interface 622 comprises a telephone with push-buttons, coupled to server 612 via a telephone network and a server-interface 624. Operation in such an interactive system is explained below by way of example.

The user turns on module 604, tunes in on the appropriate TV channel and contacts station 602 (or centre 606) over telephone 622. Station 602 then sends a request to the user to select a particular TXT page. The request may be, for example, a customized introductory screen. Alternatively, the request to select a particular TXT page can be made via a spoken message via telephone 622. The user selects his particular TXT page in the conventional way, e.g., through his remote controller, and enters his personal code into system 600 by pressing the appropriate buttons of telephone 622 as access to system 600 is conditional. Station 602 now starts an application run on server 612. From here on, the user may lay his conventional TXT controller aside as he is enabled to communicate with the application by pressing the appropriate buttons of telephone 622. System 600 identifies a specific user among a plurality of users through his personal TXT page that was assigned to him by station 602. System 600 associates the personal TXT page with the interconnection from telephone 622 to station 602. The personal TXT page can be considered to serve as individual link from station 602 to module 604 for providing the user with customized information. Terminating the communication and, therefore, the interaction of the user with the application run on server 612 is achieved, for example, by breaking the telephone interconnection.

The application run on server 612 is, for example, a virtual world. The virtual world could include graphical representations of, e.g., a city, a railway station, or any other metaphors. The user is enabled to guide a cursor through this virtual world and to select particular options, all by pressing certain buttons of his telephone 622. In the virtual city, the user may have his cursor entering, for example, a virtual library, whereupon the server provides him selectively with video and/or TXT information, e.g., regarding the latest novels, handbooks or magazines on a particular subject. This information then is provided via server 612 under selective control of one or more of the video windows discussed above. Alternatively or subsidiarily, the user may be connected to an actual library data base, shown in the window relevant to this user, to enable searching for a particular work under cursor control. Upon leaving the virtual library, the user may have his cursor entering a virtual showroom (or pub), whereupon server 612 initiates an application that enables the user to browse through brochures of (real) motorcycles currently on sale with the local dealers, again using a particular one of the video windows. Similarly, upon entering a virtual travel agency or concert hall, server 612 starts an application that enables the user to select video/text information on (real) holiday destinations or to consult the concert programs under cursor control.

Figure 7:
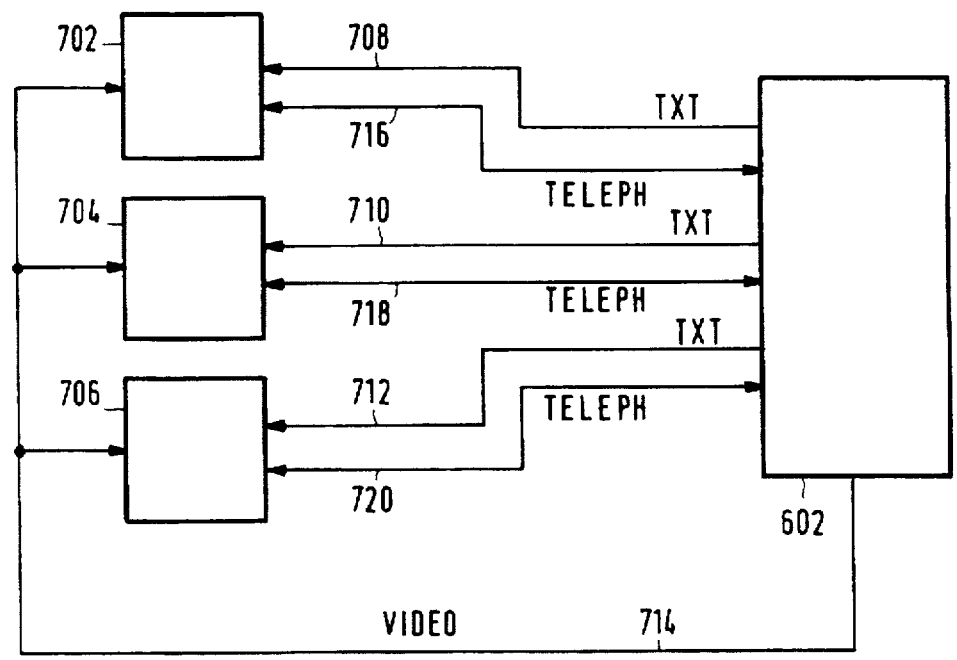
FIG. 7 is a diagram of connections in a multiple-user system.

The invention is highly suitable for an application that allows for multiple-user interaction. Different ones of the video windows can interactively be combined with different ones of the TXT pages, and the content of the windows and TXT pages can be put under user-control via server 612. FIG. 7 shows a functional diagram of a system 700 with a plurality of user modules 702, 704 and 706 coupled to station 602. Each respective one of modules 702–706 receives via the TV channel a video signal common to all modules and respective, possibly different, ones of a plurality of TXT pages. To each respective one of the users a respective TXT page is assigned serving as a customized transmission channel to the respective user. Typically, each personalized TXT page is independent of the TXT pages assigned to other users. Note that the TXT pages and video information are broadcasted as a single TV signal receivable by all modules 702–706. For the sake of clarity, however, FIG. 7 shows the personalized TXT pages and the common video information as supplied via functionally separate links 708, 710, 712 and 714, respectively. Each of modules 702–706 further is connected to station 602 via individual telephone connections 716, 718 and 720. System 700 is similar to system 600, and each of modules 702–706 is similar to module 604. Where appropriate, reference should be made to system 600 of FIG. 6 for further details.

A plurality of users may interact with the same application that is running on server 612 and/or with one another via the telephone under control of the application. Each of the users manipulating modules 702–706 has his or her own TXT page that can serve as a kind of feedback to the user of his or her current status within the application. The personal TXT page is selectively rendered transparent to show the associated video window. For example, assume that the application provides access to a virtual city visualized by graphical representations of pubs, libraries, shops, etc., as mentioned above. Each user is enabled to control his personalized cursor, e.g., the match-stick man mentioned above. A first user U1 guides his cursor to a graphical representation of a showroom for motorcycles and, upon entering, window 102 is made available to him. Window 102 provides pictures of motorcycles in video, the remainder of the screen for user U1 provides text or graphical information relating to the model currently shown in window 102. The screen for user U1 may look, for example, something like FIG. 2. Second and third users U2 and U3 both decide to guide their cursors to the graphical representation of a pub. When both users U2 and U3 have arrived, both will perceive the same video window, e.g., window 108 that starts broadcasting an American football game. Window 102 is blocked by their respective TXT pages. The application may permit users U2 and U3 to contact one another by telephone, again via server 612. Alternatively, users U2 and U3 may decide to play a (video) game in the virtual pub, the video game accessible through the appropriate video window visible to both users U2 and U3. A fourth user U4 decides to go to a real-estate agent in the virtual city and is provided with video information in window 104, supplemented by text in his TXT page. A fifth user U5 visits a video rental shop in the virtual city and is provided with excerpts of some movies in window 106, windows 102–104 and 108 being blocked.

Actions of particular ones or all of the users in a multiple-user application may be made visible via the TXT data or via the video data to specific ones or all of the participants. For example, in the virtual city application, the video data may be used to give the current location of all participants through identifiers, e.g., coloured dots, on a map of the virtual city. The map is permanently shown in a specific video window, or, alternatively, as a full-sized video image that may selectively be rendered visible, entirely or partly, by specific TXT pages. Alternatively, the video data may be enabled as a window or full-sized screen when a user guides his cursor to enter a tourist information office in the virtual city. Using the map makes it easier for the participants to meet one another in the virtual city. For example, users U1, U4 and U5 introduced in the previous paragraph may decide to make for the pub to join U2 and U3 for having a chat and to playing a game, upon observing that U2 and U3 are already there. The TXT data, however, may be unique to each of the participants depending on, e.g., their specific location in the virtual city. Alternatively, or in addition, the video data is used to provide extra information, such as news reports, to all who are in the virtual city. The map and news reports may be shown cyclically. Similarly, a multiple-user game or a multiple-user activity such as a video conference can be governed through such TXT/video application. The video information may be received by apparatuses without TXT provisions so that the application may attract an audience. The video information may be enhanced by audio information as in normal TV broadcasting. The video data may be selectively rendered visible under user-control. To this end, the user may activate or deactivate one or more video windows, e.g., by way of sending requests to server 612 via user-interface 622.

Furthermore, an application may allocate video information to one or more specific ones of the windows dependent on the user-interaction. For example, consider the virtual city in a multiple-user application as discussed above. If a particular window (or TXT page) is not active anymore because of, for example, the participants having left the associated quarter of the virtual city, server 612 may change the content of the deactivated window to prepare for visits of the participants elsewhere in the virtual city.

Video and TXT data may be blended so as to avoid annoying transitions. For example, a user guides his match-stick man cursor through the virtual city that is shown in TXT data. The user intends to enter a TXT graphics representation of the virtual city+s ice arena to watch, e.g., an ice-hockey game broadcasted in video. As TXT graphics typica'ly has a lower resolution than video data, the transition from TXT to video and back again may give rise to sudden changes in the quality of the image on the screen. The transition from TXT to video then may be smoothened by initially adapting the resolution of the video data to that of the TXT data and gradually increasing the video resolution. When leaving the ice arena the reverse may take place.

Further, the user may have his match-stick man cursor in TXT graphics live on in the video part of the application in video graphics, possibly of higher resolution.

Note that the shape of the video windows need not be rectangular and that the shape may be varied, e.g., in dependence on the TXT data. For example, the video data in the TXT virtual city application can be used to enhance the quality of the image. The virtual city's buildings are represented in graphics outlined against a sky in video. When strolling around the virtual city, the perspective continually changes and so does the visible portion of the sky. Accordingly, the perimeter of the video window showing the sky has a part whose form depends on the location and orientation of the user with respect to the virtual city. As the shape of the visible portion of the video signal is determined by the control data in the TXT data, it is clear that the shape of the video window may be made dependent on the TXT data. Alternatively, the user can be enabled to determine the shape through manipulating the control data.

In the example shown, system 600 is provided with control centre 606 to control operational activities of server 612. Centre 606 is operative to, e.g., enable monitoring the operation of server 612, to enable the content-owner to download new applications or to maintain or update the applications run on server 612, to provide further customer services, or to extend the processing capabilities of server 612. Centre 606 includes a local processing system 626 coupled to server 612 via interfaces 628 and 630, e.g. modems.

What is claimed is:

1. A method of enabling combining video data and teletext data supplied via a transmission channel, the method including:

providing the teletext data representative of a plurality of teletext pages;

providing the video data representative of a synthesized image composed of a plurality of video windows;

enabling selectively combining a respective one of the teletext pages with the synthesized image so as to render visible a respective one of the video windows;

running an application on a server to generate the video data and the teletext data;

enabling at least one user to determine a content of at least the video data or the teletext data by interaction with the application via a further transmission channel to the server.

2. The method of claim 1, further comprising the steps of:

enabling a plurality of users to interact with the application;

providing in at least one of the video windows a status of the plurality of users with respect to the application.

3. The method of claim 1, wherein the further transmission channel comprises a telephone line.

4. The method of claim 2, wherein a plurality of users are enabled to interact with the application; and the method further comprises the step of enabling the users to communicate with one another via the further transmission channel.

* * * * *